United States Patent [19]

Yoshimura

[11] Patent Number: 5,032,973
[45] Date of Patent: Jul. 16, 1991

[54] OPTICAL RECORDING MATERIAL CONTAINING PHOTOCHROMIC COMPOUNDS

[75] Inventor: Motomu Yoshimura, Amagasaki, Japan

[73] Assignee: Mitsubishi Denki Kabushiki Kaisha, Tokyo, Japan

[21] Appl. No.: 290,199

[22] PCT Filed: Jun. 10, 1987

[86] PCT No.: PCT/JP87/00371
§ 371 Date: Dec. 2, 1988
§ 102(e) Date: Dec. 2, 1988

[87] PCT Pub. No.: WO88/09957
PCT Pub. Date: Dec. 15, 1988

[51] Int. Cl.$^5$ .................. G11C 13/04; G11C 7/00
[52] U.S. Cl. .................... 365/119; 365/126; 369/100; 369/110; 430/945
[58] Field of Search .............. 369/100, 110; 365/112, 365/106, 119, 113, 122, 126; 430/941, 962, 945

[56] References Cited

U.S. PATENT DOCUMENTS

| | | | |
|---|---|---|---|
| 3,568,167 | 3/1971 | Carson | 365/119 |
| 3,654,626 | 4/1972 | Geller et al. | 365/119 |
| 3,720,921 | 3/1973 | Schools et al. | 365/119 |
| 4,101,976 | 7/1978 | Castro et al. | 365/119 |
| 4,103,346 | 7/1978 | Haarer et al. | 365/119 |
| 4,158,890 | 6/1979 | Burland | 365/119 X |
| 4,459,682 | 7/1984 | Mossberg | 365/119 |
| 4,649,518 | 3/1987 | Sadijan | 365/119 X |
| 4,816,367 | 3/1989 | Sakojiri | 430/945 |
| 4,819,210 | 4/1989 | Miura et al. | 365/119 |
| 4,879,009 | 11/1989 | Clark | 430/945 |
| 4,904,561 | 2/1990 | Yamamoto | 430/945 |
| 4,910,116 | 3/1990 | Nakai | 430/945 |

FOREIGN PATENT DOCUMENTS 59-227972 12/1984 Japan .
61-184535 8/1986 Japan .
61-203450 9/1986 Japan .
61-215542 9/1986 Japan .
WO89957 12/1988 PCT Int'l Appl. .

OTHER PUBLICATIONS

IEEE Transactions on Electron Devices, vol. ED-18, No. 9, Sep. 71, pp. 724–732, "A True-Dimensional Display", by Lewis et al.
Modern Optics, Mar. 1967, pp. 743–752, "Properties of Photochromic Memories", by Herman.
IBM Journal of Research and Development, vol. 26, No. 2, Mar. 1982, pp. 198–208, "Multiple Photochemical Hole Burning in Organic Glasses and Polymers by Guitiérrez et al.".
IBM Tech. Discl. Bull., vol. 21, No. 8, Jan. 79, p. 3333, "Magnetic and Electric Field Addressing of PHB Memories", by Castro et al.
"Topical Meeting on Optical Data Storage", Apr. 18–20, 1984, pp. WC-A2-1-4, SC-A3-1-4 & Thc-B-1-1-4.

Primary Examiner—Aristotelis M. Psitos
Assistant Examiner—Alfonso Garcia
Attorney, Agent, or Firm—Wolf, Greenfield & Sacks

[57] ABSTRACT

An optical recording material (21a) or a photochemical hole burning reaction. That is to say, informations are recorded in the recording material formed of a recording member in which molecules ($D_1$) to ($D_3$) having a property of changing characteristics of an optical absorption spectrum before and after the absorption of light by absorbing a light within an inherent wavelength range of the optical absorption spectrum are linked with at least one macromolecular chain (P). The optical recording material can be used in memories in the computer system and the like.

9 Claims, 3 Drawing Sheets

OPTICAL RECORDING MATERIAL CONTAINING PHOTOCHROMIC COMPOUNDS

FIELD OF THE INVENTION

The present invention relates to an optical recording material, in particular to an optical recording material utilizing a photochromistic compound or a photochemical hole burning reaction (hereinafter referred to as PHB reaction).

PRIOR ART

FIG. 1 is a sectional view showing the conventional optical recording material and apparatus. Referring now to FIG. 1, reference numeral (1a) designates a source of a laser beam for use in recording, reference numerals (1b), (1c) designates a laser beam, reference numeral (3) designates an objective lens, reference numeral (2) designates a disc, reference numeral (2a) designates an optical recording material such as tellurium compounds, and reference numeral (2b) designates an optical recording material-supporting substrate formed of glass and the like. Reference numeral (4) designates a pit (small hole) recorded in the optical recording material as an information.

In operation, the informations are recorded by collecting the laser beam (1b) on a surface of the optical recording material (2a) by means of the objective lens (3) while rotating the disc (2) and modulating the laser beam by means of the information to be written. Thus, the information is written in the optical recording material (2a) in the form of the pit (the small hole) formed by the thermal processing.

In the method, in which the information is written by means of the thermal processing by the use of the laser beam in the above described manner, only one bit enters one pit.

Since the conventional optical recording material has the above described construction, the quantity of informations written per unit area of the recording material is determined by the number of pits which can be formed per unit area of the recording material. As a rule, in the existing writing by the use of a laser beam a diameter of a laser spot is about one micron and also a diameter of the pit is about one micron at most. Accordingly, the number of pits, which can be written per one square centimeter (1 cm$^2$), that is, the memory capacity, amounts to 10$^8$ bits/cm$^2$ at most.

DESCRIPTION OF THE INVENTION

It is an object of the present invention to stabilize the preservation of the recorded informations. In addition, in the preferred embodiments of the present invention, it is an object of the present invention to provide an optical recording material capable of increasing a limiting value of the memory capacity per unit area to 10$^8$ bits/cm$^2$ or more by eliminating the above described problems incidental to the prior art and giving the multiplicity capable of writing the information in one spot of the optical recording material even at an order of wavelength of a light but not one bit in one spot.

An optical recording material according to the present invention comprises a recording member in which a compound having an inherent wavelength range of an optical absorption spectrum and a property of changing characteristics of the optical absorption spectrum before and after the absorption of light by absorbing a light within the optical absorption spectral wavelength range is linked with at least one macromolecular chain.

In addition, concretely speaking, the above described recording member has at least two kinds of different optical absorption spectral wavelength ranges, a recording medium being formed of a mixture comprising these recording members, whereby the multiple recording at an order of wavelength becomes possible within at least two optical absorption spectral wavelength ranges.

According to the present invention, the information is recorded by the use of a compound changing characteristics of the optical absorption spectrum before and after the absorption of light as the optical recording material, so that the characteristics of the optical absorption spectrum can be changed by applying a light within the optical absorption wavelength range of the molecule to the optical recording material and the existence of this change can be recorded in the form of signal of binary code 0, 1.

Since the recording member is constructed by linking the above described compound with the macromolecular chain, not only the preservation of the recorded informations can be stabilized but also the temperature stability can be increased.

In addition, if at least two kinds of compounds having wavelength ranges of the optical absorption different from each other are comprised in the optical recording material and the respective compounds are fixedly linked with the macromolecular chain, the mutual action between different kinds of compounds absorbing a light is remarkably weakened in comparison with that in the case where they are not fixedly linked with the macromolecular chain but merely mixed. As a result, the respective compounds can maintain their unique characteristics of the optical absorption spectrum as they are in the optical recording material and bring about the change in characteristics of the optical absorption spectrum due to the absorption of a light within the respective unique wavelength ranges. That is to say, the informations can be recorded within the wavelength ranges of the optical absorption spectrum of the respective molecules and the multiple recording of informations at an order of wavelength becomes possible, whereby the recording density can exceed the limiting value of 10$^8$ bits/cm$^2$ of that of the conventional optical recording material.

In addition, the compound absorbing a light and carrying out the recording in the optical recording material must be linked with at least one macromolecular chain but if it is linked with two or three macromolecular chains, the mutual action between different kinds of compounds is still more weakened, which is preferable.

PREFERRED EMBODIMENTS

Figure 1:
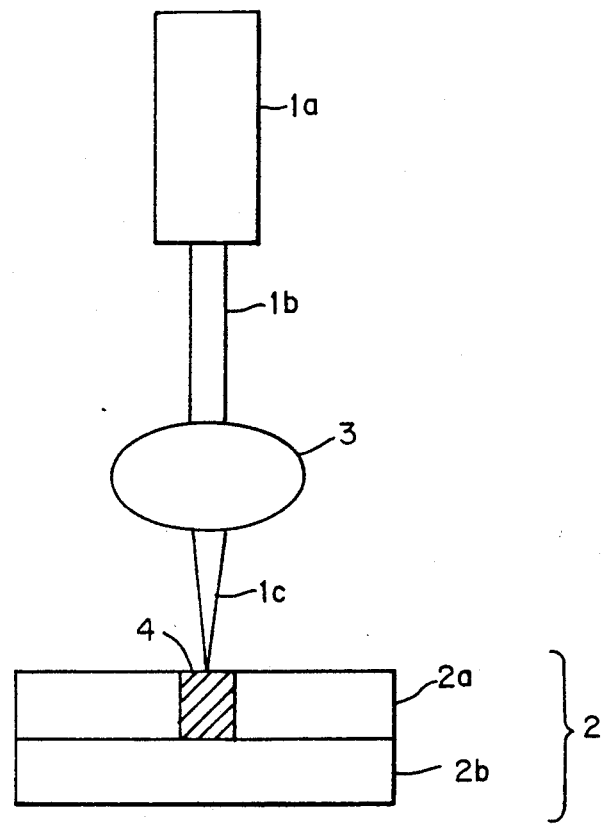
FIG. 1 is a block diagram showing the conventional optical recording apparatus.
Figure 2:
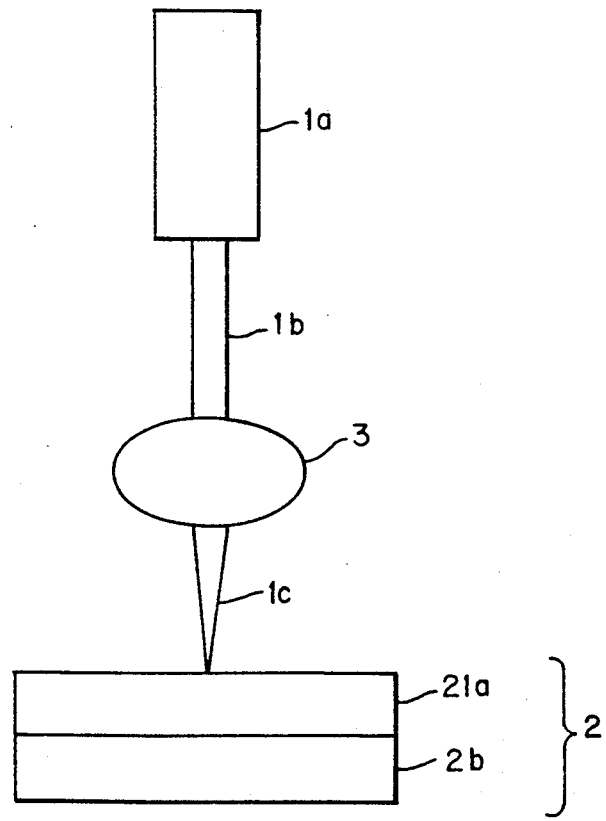
FIG. 2 is a block diagram showing an optical recording apparatus using an optical recording material according to one preferred embodiment of the present invention.
Figure 3A:
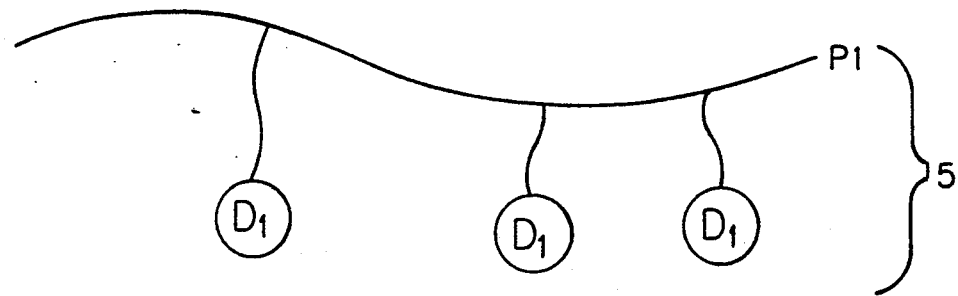
FIG. 3 is a general view showing one example of a molecular model of an optical recording material according to the present invention.
Figure 3B:
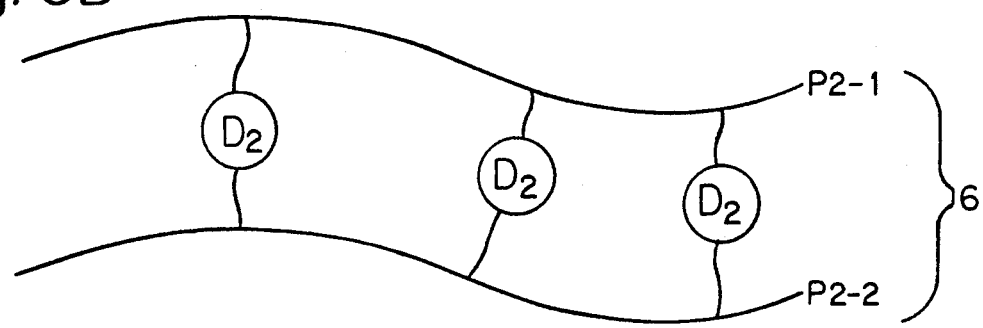
Figure 3C:
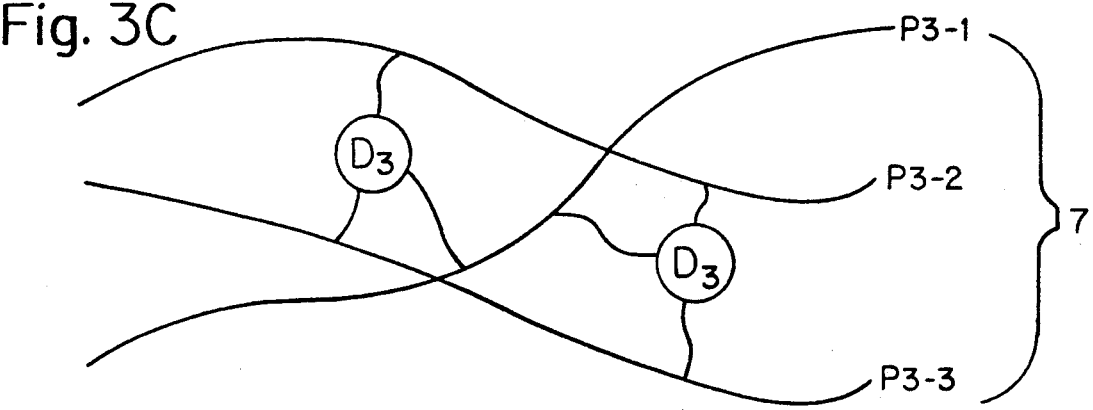

Referring to FIG. 2, reference numerals (1a), (1b), (1c), (2b) and (3) are same as those in the conventional optical recording apparatus. Reference numeral (21a) designates an optical recording material according to the present invention. Referring to FIG. 3 which is a general view showing one example of a molecular model of an optical recording material according to the present invention, reference numeral (5) shows a case where a compound ($D_1$) absorbing a light is fixedly linked with one macromolecular chain ($P_1$), reference numeral (6) showing a case where a compound ($D_2$) is fixedly linked with two macromolecular chains ($P_{2\text{-}1}$ and $P_{2\text{-}2}$), and reference numeral (7) showing a case where a compound ($D_3$) is fixedly linked with three macromolecular chains ($P_{3\text{-}1}$, $P_{3\text{-}2}$, $P_{3\text{-}3}$).

In addition, the linking of the compound absorbing a light with the macromolecular chain can be achieved in accordance with the general technique by adding a pair of functional groups capable of bringing about a general chemical linking reaction, such as condensation reaction, to both the molecule absorbing a light and the macromolecular chain, respectively.

EXAMPLE 1

An Example of the optical recording material (21a) in which a so-called photochromistic compound, of which absorption peak of the optical absorption spectrum is shifted before and after the absorption of light, is used as the compound (D) will be described.

Three kinds of photochromistic compound $D_4$, $D_5$, $D_6$ are fixedly linked with two macromolecular chains individually by a method according to (6) in FIG. 3. The same or different kind of macromolecular chain may be used for $D_4$, $D_5$, $D_6$ but in this Example, $D_4$, $D_5$, $D_6$ are individually fixedly linked to two of the same kind of methacrylamide polymers. A methacrylamide polymer with $D_4$ fixedly linked therewith, a methacrylamide polymer with $D_5$ fixedly linked therewith and a methacrylamide polymer with $D_6$ fixedly linked therewith are dissolved in solvents or molten to mix and then the resulting mixture is applied to a substrate and dried to form a recording medium.

Figure 4:
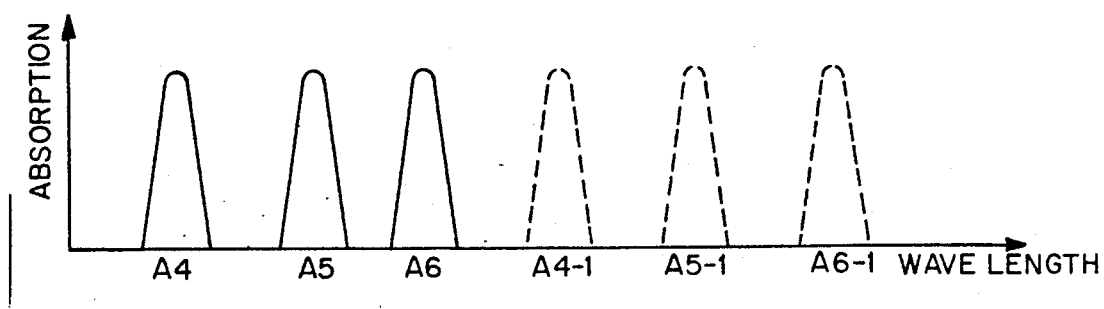
FIG. 4 is a characteristic diagram showing characteristics of an absorption spectrum of an optical recording material according to one preferred embodiment of the present invention.

In addition, the respective absorption wavelength ranges of the optical absorption spectrum of $D_4$, $D_5$, $D_6$ have a peak at $A_4$, $A_5$, $A_6$, as shown in FIG. 4. In addition, these peaks are shifted to $A_{4\text{-}1}$, $A_{5\text{-}1}$, $A_{6\text{-}1}$, respectively, by absorbing a light within the respective absorption ranges.

Figure 5:
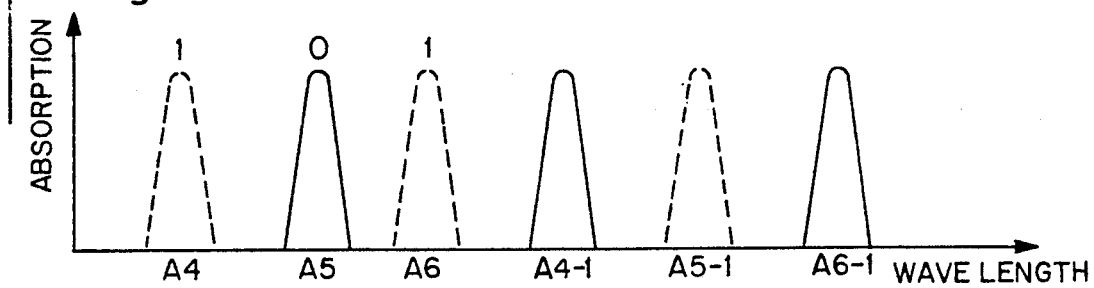
FIG. 5 is a characteristic diagram showing one example of characteristics of an absorption spectrum of the optical recording material shown in FIG. 4 after informations were recorded in the optical recording material.

If lights of $A_4$ and $A_6$ are applied to this optical recording material, the characteristics of the absorption spectrum of the optical recording material as a whole become as shown in FIG. 5, that is, absorption peaks at $A_4$ and $A_6$ disappear. If the existence of this absorption peak is expressed by a binary code 0, 1, a multiple optical recording can be achieved at an order of wavelength of (1, 0, 1).

In addition, all photochromic materials including spiropyran compounds, fulgide compounds, azobenzene compounds and complex compounds, such as Ru complex compounds and Hg complex compounds, can be used as the photochromic compounds used as the optical recording material (21a).

EXAMPLE 2

An Example, in which a compound showing a so-called hole burning phenomenon (PHB molecule: photochemical hole burning molecule) removed of only the absorption at the absorbed wavelength portion from the absorption spectrum before the absorption of light by absorbing a light is used as the compound used as the recording member in the optical recording material (21a), will be described.

Figure 6:
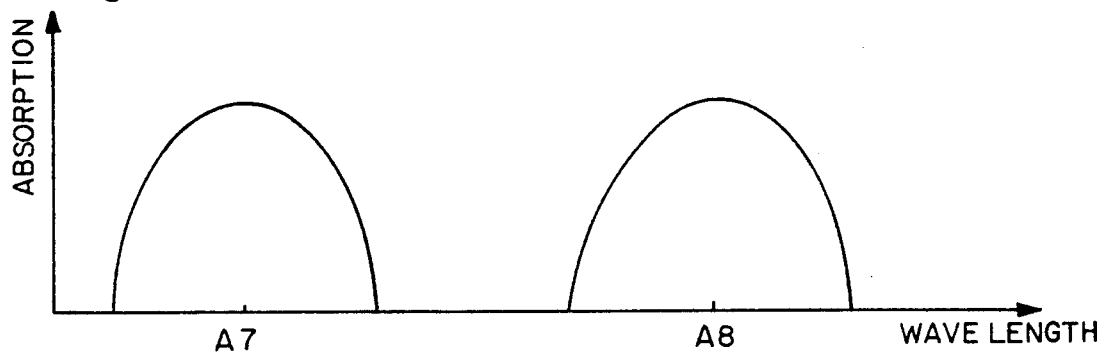
FIG. 6 is a characteristic diagram showing characteristics of an absorption spectrum of an optical recording material according to another preferred embodiment of the present invention.

Two kinds of porphyrin $D_7$, $D_8$, which are PHB compounds, are used to be fixedly linked with two methacrylamide polymers, which are macromolecular chains, individually by the method according to (6) in FIG. 3. In addition, the absorption wavelength ranges of the optical absorption spectra of $D_7$, $D_8$ have a peak at $A_7$ and $A_8$, respectively, as shown in FIG. 6.

Figure 7:
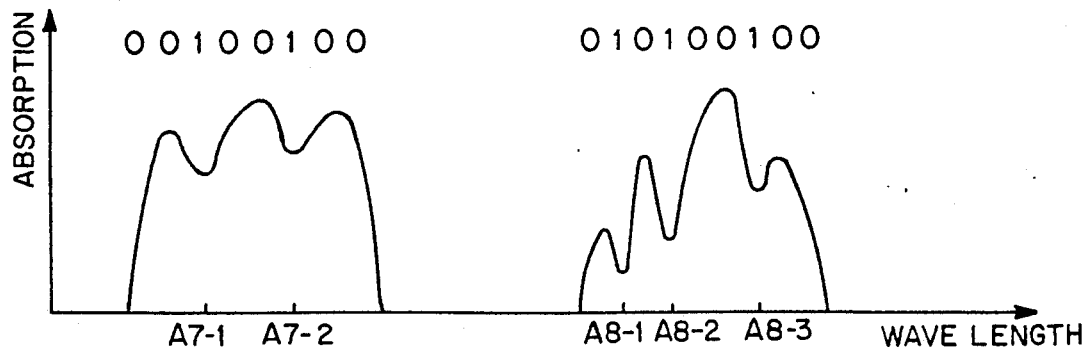
FIG. 7 is a characteristic diagram showing one example of characteristics of an absorption spectrum of the optical recording material shown in FIG. 6 after informations were recorded in the optical recording material.

If laser beams having five wavelengths of for example $A_{7\text{-}1}$, $A_{7\text{-}2}$, $A_{8\text{-}1}$, $A_{8\text{-}2}$, $A_{8\text{-}3}$ are applied to this optical recording material, the spectrum wanting in the absorptions at those wavelength portions, as shown in FIG. 7, is obtained, whereby the multiple recording of informations at an order of optical wavelength of (0, 0, - - -, 1, 0, - - -, 1, - - -, 0, 1, - - -, 0, - - -, 1, 0, - - -, 0, 1, - - -, 0), in which the portions wanting in the absorption is expressed by 1 and the rest is expressed by 0. With the optical recording material using the PHB material, about 1,000 informations are multiply recorded in one PHB compound at an order of wavelength. Accordingly, the multiple recording at an order of wavelength can be still more increased about 2,000 to 10,000 times by using a plurality of kinds of PHB compound. In addition, if the macromolecular chain, which becomes a host material, is cross-linked by the compound absorbing a light, the thermal motion of the material system is suppressed, whereby the optical recording by the PHB reaction can be achieved even at high temperatures.

In this time, all materials showing the hole burning phenomenon including chlorine compounds, porphyrin compounds, phthalocyanine compounds, quinizarin compounds, aminoacridine compounds, perylene compounds, alkali halide compounds and the like can be used as the molecule showing the hole burning phenomenon.

In addition, general macromolecules including methacrylic macromolecules, polycarbonate macromolecules, polyamide macromolecules and the like can be used as the macromolecules having the macromolecular chain linking the molecules as the recording member therewith.

INDUSTRIAL AVAILABILITY

The present invention can be used in memories in the computer system and the like.

What is claimed is:

1. An optical recording material containing at least two different types of photochromic compounds linked to at least one polymeric chain, said photochromic compounds selected from the group consisting of spiropyran, fulgide compound, chlorine compound, complex compound, porphyrin, phthalocyanine, quinizarin, amino acridines, perylenes, and alkali halide, said compounds having an inherent wavelength range of an optical absorption spectrum and a property of changing characteristics with the optical absorption spectrum before and after the absorption of light by absorbing a light within said wavelength of said optical absorption spectrum, whereby the mutual interaction between the different kinds of compounds absorbing the light is weakened.

2. A material as claimed in claim 1 wherein information in the optical recording material is stabilized.

3. A material as claimed in claim 1 wherein the temperature stability of the optical recording material is increased.

4. A material as claimed in claim 1 having a recording density greater than $10^8$ bits/cm$^2$.

5. A material as claimed in claim 1 wherein at least one of the different types of photochromic compounds is fixedly linked with at least one of two and three polymeric chains.

6. A material as claimed in claim 5 wherein both types of photochromic compounds are fixedly linked with at least one of two and three polymeric chains.

7. A material as claimed in claim 1 wherein the photochromic compounds are selected from the group consisting of a spiropyran, fulgide, complex compound and chlorine compound.

8. A material as claimed in claim 7 wherein the photochromic compounds are selected from the group consisting of porphyrins, phthalocyanines, quinizarins, amino acridines, perylenes, and alkali halides.

9. A material as claimed in claim 1 wherein the macromolecular chain is selected from the group consisting of methacrylic, polycarbonate, and polyamide macromolecular chains.

* * * * *